UNITED STATES PATENT OFFICE.

CYPRIEN M. TESSIÉ DU MOTAY, OF PARIS, FRANCE, AND AUGUSTE J. ROSSI, OF NEW YORK, N. Y.

PRODUCTION OF COLD FOR MANUFACTURING ICE.

SPECIFICATION forming part of Letters Patent No. 228,488, dated June 8, 1880.

Application filed February 24, 1880.

*To all whom it may concern:*

Be it known that we, CYPRIEN M. TESSIÉ DU MOTAY, of Paris, France, and AUGUSTE J. ROSSI, of New York, N. Y., have invented a new and useful Improvement in the Production of Cold for Manufacturing Ice, and for other purposes, which invention is fully set forth in the following specification.

Heretofore cold has been artificially produced by means of ammonia, it being alternately absorbed in and expelled from water. A solution of ammonia being prepared, the same is heated, and the ammonia, being driven off as gas, is collected in a suitable vessel cooled by a water-circulation, where, by the pressure of its own vapor, aided by the cooling medium, the ammonia is liquefied. Volatilization is then permitted to take place, the gas, as it is formed, being absorbed in cold or cool water. In such ice-machines the compression-pumps and operating engine or motor required when the gaseous refrigerating agent is liquefied by mechanical compression are dispensed with, so that they are specially suited on that account for private establishments or other places where small, economical, and inexpensive machines are desired. In operation, however, with ammonia difficulties are experienced on account of the great pressure required to effect the condensation and the consequent high temperature required to produce the necessary tension of the vapor, so that there is considerable liability to explode, and the parts must be made heavy to oppose sufficient resistance. Owing to the high temperature, also, the expenditure of fuel is large. Moreover, the water is apt to be carried over with the ammonia, and being afterward frozen, it clogs the machine.

The pressure required for the liquefaction of ammonia is from one hundred and twenty-five pounds to two hundred pounds per square inch, and the temperature in what are called "hand" machines varies from 130° centigrade (265° Fahrenheit) with condensing-water at 12° centigrade (53° Fahrenheit) to 150° centigrade (312° Fahrenheit) with the water for condensation at 25° centigrade (77° Fahrenheit.)

This invention has relation more particularly to what may be called the same class of processes—that is, the liquefaction or condensation of the refrigerating agent is effected by the tension of its own vapor, aided, of course, by a cooling medium, and it is alternately absorbed in and expelled from a suitable liquid. The principal object is to produce cold at less pressure and temperature than before required, so that waste heat may be employed or the consumption of fuel may at any rate be materially reduced, to obtain increased efficiency and economy, and generally to overcome the difficulties and objections, such as indicated above, which have been heretofore experienced in producing cold artificially by this class of processes.

The invention is applicable to the production of cold and manufacture of ice on a large scale, as well as by means of small or hand machines.

In order to obtain a refrigerating agent condensable at low temperatures and pressures, we employ sulphurous dioxide, (anhydrous sulphurous acid,) and cause it to be absorbed in a suitable liquid, from which it can be readily expelled and separated by the application of heat. We have found among the liquids capable of absorbing sulphurous dioxide that the ethers formed by the action of oxacids (inorganic or organic) on different alcoholic radicals, or by the action of salts of these acids in presence of sulphuric acid and the alcoholic radicals, or prepared by some other indirect ways, as well as the alcoholic radicals themselves, absorb sulphurous dioxide in proportions varying, according to the different ethers, from twenty to fifty-eight parts, or more, in weight of the latter in one hundred parts of the compound or binary liquids; that the mixtures of such of these ethers as were not chemically antagonistic would also absorb sulphurous dioxide in proportions depending upon the ether employed, and that all the liquids obtained, when charged to the proper degree of saturation, had no appreciable tension at ordinary temperatures, and were practically uninflammable.

We have ascertained, also, that all these ethers or mixtures of them—absorbents of sulphurous dioxide—thus saturated, even those of which the boiling-points were the highest, could and actually did abandon their sulphurous dioxide by the application of a moderate heat at temperatures ranging from 38° to 50° centigrade, (100° to 122° Fahrenheit,) all inferior to the boiling-point of water, 100° centigrade, (212° Fahrenheit.)

On these principles and properties we have based the new process for the production of artificial cold or ice, constituting the first part of this invention, and consisting in driving off the sulphurous dioxide from its absorbent by heat and reducing it to a liquid condition by the pressure of its own vapor aided by a cooling medium, and then cooling the absorbent and permitting the sulphurous dioxide to be reabsorbed, thus producing a diminution of pressure or partial vacuum, which causes the volatilization of the liquefied sulphurous dioxide, and produces cold.

In the liquefying of the sulphurous dioxide the cooling medium employed may be water at ordinary temperatures; but in order to reduce the pressure necessary it is preferred to employ a volatile liquid, such as sulphuric ether, naphtha or gasoline, sulphide of carbon, &c., the vapors of which are returned to a liquid condition by their own pressure or tension and a circulation of water; and this method, which is applicable as well to the condensation of the gaseous refrigerant in other processes, constitutes the second part of our invention.

When water at ordinary temperatures is employed as the cooling medium for condensing the sulphurous dioxide the pressure required is from forty to sixty pounds, or thereabout; but with the volatile liquid it may be reduced to twenty or twenty-five pounds, or even lower.

The third part of our invention consists in a binary liquid for use in the production of cold by means of a refrigerating agent alternately absorbed in and expelled from an absorbing-liquid composed of an absorbent liquid having a boiling-point above that of water and a refrigerating agent absorbable therein, but capable of being driven off and condensed by the tension of its own vapor at a temperature below the boiling-point of water, and specially the liquid composed of oxalic ether, sulphate of methylene, or other like liquid or mixtures of them having a high boiling-point, and sulphurous dioxide absorbed therein. In producing cold on the above-mentioned principle the absorbed refrigerant must be driven or liberated by heat from the absorbent under conditions which retain the latter in a liquid state.

Binary liquids, which have as the absorbent a liquid volatile under approximately the conditions of temperature and pressure required to liberate the absorbed material—such as, for example, sulphuric ether holding sulphurous dioxide in absorption—will not answer the purposes of this invention.

The advantage of having a wide interval between the boiling-point of the absorbent and the temperature at which the absorbed refrigerating agent is liberated is obvious. In the binary liquid, in which our invention in part consists, not only is this advantage obtained, but the boiling-point of the absorbent being above (with the special liquid mentioned considerably above) that of water, and the absorbed refrigerant being liberated below that point, the danger of volatilizing the absorbent may be readily avoided, the regulation of temperature being effected by a water-bath or similar means, and the consumption of fuel on account of the lowness of temperature required is small. It is not, in fact, proposed to run the temperature higher than 140° Fahrenheit.

Our invention also comprises the use of a practically uncongealable absorbent in the production of cold in ice-machines by driving off and condensing the refrigerating agent by means of heat applied to the binary liquid, and then permitting the volatilization and reabsorption of the refrigerating agent, and the application of the property of ethers when saturated with sulphurous dioxide of being uninflammable as a means for their transportation without danger, a gentle application of heat or a water-bath being sufficient to drive off the sulphurous dioxide, and thus regenerate the ethers.

In order that others skilled in the art may be able to make and use our invention, we proceed to describe more particularly the manner of carrying the same into effect.

The apparatus may be such as have been used in connection with a solution of ammonia, but need not be so strong as necessary for use with those materials, and may be much simpler.

It consists generally of, first, a boiler adapted to be heated to a temperature below 100° centigrade, (212° Fahrenheit,) by lost heat of furnaces, exhaust-steam, or other suitable means, in which the refrigerating agent can be driven from the less volatile liquid, in which it is absorbed; second, a liquefier or condenser, being a system of coils, tubular boiler, or other ordinary or suitable contrivance, in which the refrigerant can be liquefied by the pressure of its own gas and the aid of a cooling medium; third, a congealer or congelator, being a system of coils or pipes or other suitable contrivance, in which the volatilization of the liquefied refrigerating agent takes place, the heat necessary being taken from a surrounding medium, an uncongealable liquid or mixture, such as glycerine and water, solutions of chloride of calcium, sodium, or magnesium, &c., being ordinarily employed; and, fourth, an absorber or system of absorbing vessels, in which the volatilized refrigerant is reabsorbed in the exhausted absorbent liquid from the boiler and the binary liquid is reformed, ready to be returned to the boiler, the heat disengaged by such absorption being carried off by a circulation of a cooling medium, ordinarily water. These several vessels or devices are connected in any ordinary or suitable way, as will be readily understood by those skilled in the art.

It is evident that such an apparatus admits of various modifications and changes. The binary liquid is prepared by absorption of sulphurous dioxide in a suitable absorbent liquid. The following are well adapted, the percentage of absorption indicated being taken with reference to the binary liquid—that is, the quantity of sulphurous dioxide contained in one hundred parts of the binary liquid: Oxalic ether, boiling at 184° centigrade, (363° Fahrenheit,) absorption forty-eight per cent.; amylic alcohol, boiling at 132° centigrade, (270° Fahrenheit,) absorption twenty per cent. to twenty-five per cent.; sulphate of methyline, boiling at 188° centigrade, (370° Fahrenheit;) formiate of amyle, boiling at 116° centigrade, (241° Fahrenheit,) absorption twenty-four per cent.; acetate of amyl, boiling at 125° centigrade, (257° Fahrenheit,) absorption twenty-seven per cent.

The sulphurous dioxide is introduced into the absorbent material to saturation. This may be accomplished in any ordinary or suitable way—for example, by placing the absorbent in a suitable receptacle and introducing the sulphurous dioxide through a pipe the end of which dips below the level of the absorbent liquid, the heat generated by the absorption being carried off by the aid of a water-jacket or by any suitable cooling medium. The point of saturation can be readily determined by means of a hydrometer. If desired, the absorber or absorbing apparatus just described could be used; or the absorbent may be introduced into a close vessel provided with an alarm adapted to be operated or controlled by the pressure of gas inside the vessel, and the sulphurous dioxide, being forced therein, will sound the alarm after saturation of the absorbent is complete.

A suitable quantity of the binary liquid thus formed is introduced into the boiler, which is heated in a water-bath by means of a small furnace, lamp, or gas-jet, by the exhaust-steam from high-pressure engines, which can be very advantageously done, or the water of condensation of condensing-engines, slightly heated to the proper point, if necessary, by waste heat of furnaces, of boilers, evaporators, concentrators, stills, or other apparatus—in a word, the heat led to waste in the smoke-stack of any combustion-furnace, or other waste heat, or in any suitable way. The temperature of the liquid is raised to 50° or 60° centigrade, (122° to 140° Fahrenheit,) or it may be somewhat higher if desired, but less advantageously.

The sulphurous dioxide is driven off by the elevation of temperature, and is received in a gaseous state in the coils or envelope of the liquefier or condenser, where it is reduced to a liquid by the pressure of its own gas and the action of the cooling medium by which the coils or envelope are surrounded. This cooling medium may be water circulated through the apparatus, in which case, with the water at ordinary temperature, the pressure required for condensation will be forty to sixty pounds. This pressure is, however, greater than desirable, especially for small machines, and it is therefore preferred to employ as such medium a liquid vaporizable at or below the temperature of the sulphurous-dioxide gas when it arrives from the boiler—say 60° centigrade, (142° Fahrenheit,) or from 60° centigrade to 70° centigrade, (142° to 158° Fahrenheit,) such as sulphuric ether, which volatilizes at 35.5° centigrade, (96° Fahrenheit,) naphtha or gasoline, sulphide of carbon, or similar liquid. This liquid, whichever one may be used, is contained in a close vessel, and the vapor is collected and conveyed to a vessel cooled by a circulation of water, wherein it is condensed by its own pressure aided by a water-circulation. In the case of sulphuric ether this pressure need be only a few pounds above that of the atmosphere.

The sulphuric ether or other liquid medium volatilizing at the temperature of the gaseous sulphurous dioxide, as it arrives from the boiler, absorbs as its latent heat of volatilization a larger amount of heat than the same amount of water, thereby lowering much more the temperature of the sulphurous dioxide and diminishing the pressure necessary to produce its liquefaction. In this way the pressure required would not exceed at most twenty to twenty-five pounds, and may be somewhat less. The liquefied sulphurous dioxide is allowed to flow into the congealer, in the coils of which it vaporizes, and these coils being in communication with the absorber, into which the exhausted liquid from the boiler is drawn, and said liquid, being cooled by a water-circulation, absorbs the refrigerant, thus lowering the pressure upon the liquefied refrigerant in the congealer and causing a continuous volatilization to take place therefrom until the absorbent liquid is saturated, when it is returned to the boiler and the sulphurous dioxide is expelled, as before. The volatilization of the liquefied sulphurous dioxide in the congealer cools the uncongealable liquid with which commonly the coils are surrounded. If ice is to be made or water or other liquid to be cooled, cans filled with the water or liquid are submerged in the uncongealable liquid until the ice is formed or the temperature reduced to the desired degree. If the cold is to be utilized for other purposes, appropriate devices are employed, as well understood in the art.

It is obvious that for carrying out this process only two vessels are essential, as the boiler may be made to serve alternately as the absorber and the liquefier as the congealer. The process may be rendered continuous by the use of duplicate boilers and absorbers, so that they can be alternately employed, or by means of apparatus similar to that employed for the same purpose in the production of cold by the solution of ammonia, or in other arts, where the absorption of gases in liquids and their expulsion from solution by heat are practiced, such as the manufacture of soda by the ammonia process.

The manufacture of the absorbents may be accomplished in any known or suitable way. It forms no part of this invention, and no description is therefore deemed necessary.

Among the absorbent materials mentioned, oxalic ether is particularly well adapted for use in the present invention, since it can be readily prepared, and on account of its high boiling-point.

Among other absorbents of sulphuric dioxide, I would mention the following, the percentage indicated being the quantity of sulphurous dioxide contained in one hundred parts of the binary liquid:

Alcohol, boiling-point 79° centigrade, (174° Fahrenheit,) absorption twenty per cent. to twenty-five per cent.; acetic ether, boiling-point 70° centigrade, (158° Fahrenheit,) absorption fifty-two per cent.; nitric ether, boiling-point 85° centigrade, (185° Fahrenheit;) amylic ether, boiling-point 112° centigrade, (232° Fahrenheit;) methylic alcohol, boiling-point 65.5° centigrade, (150° Fahrenheit,) absorption forty per cent.; glycerine, boiling-point 600° Fahrenheit, absorption six per cent. to eight per cent.

In view, however, of the comparatively low temperature at which most of these volatilize or their small absorption power, they are not considered as advantageous as those before mentioned. In practice, the absorbent should have a boiling-point considerably above, and part with their absorbed gas at a point considerably below, the boiling-point of water. In general, the higher the boiling-point of the absorbing-liquid the better, provided it absorb a sufficient quantity of the refrigerant and yield it up at a comparatively low temperature. With sufficient care, however, on the part of the operator it is possible to employ the ethers boiling at low temperatures, such as those specified; but those boiling below 60° centigrade are not suitable for the production of cold in accordance with this invention. Should any of the absorbing-liquid be carried over into the condenser and congealer, it would interfere somewhat with the operation by holding in absorption a part of the refrigerating agent; but, being uncongealable, it would not freeze and clog the machine, as in the case of the water in ammonia-machines.

In order to apply the properties, before described, of the binary liquids formed by the absorption of sulphurous dioxide in ethers to the safe transportation of the latter, they are saturated with the sulphurous dioxide, and when carried to the desired place are regenerated by driving off the sulphurous dioxide through the application of a gentle heat.

As I have before indicated, the components of the binary liquid may be simple or compound. A mixture of absorbent materials not antagonistic may be used to absorb the sulphurous dioxide and other absorbable refrigerating agents not antagonistic to and condensable with sulphurous dioxide might be used in connection with it.

Having thus fully described our said invention and the manner in which the same is or may be carried into effect, what we claim, and desire to secure by Letters Patent, is—

1. The method of producing cold by means of sulphurous dioxide by the application of the faculty of absorption of that gas by certain ethers and other absorbents, and the property of such absorbents of abandoning it at low temperatures, below their own boiling-points, consisting in heating a binary liquid composed of sulphurous dioxide and a suitable absorbent to the required temperature below the boiling-point of said absorbent, so as to drive off and effect the condensation of the sulphurous dioxide, as described, and then causing the volatilization and reabsorption of the latter, substantially as set forth.

2. In the production of cold for the manufacture of ice and for other purposes, the method of facilitating the liquefaction of the gaseous refrigerating agent by the aid of a volatile liquid, consisting in cooling the same while in a compressed state by the evaporation of the volatile liquid, and condensing the vapor of said liquids by their own pressure and the application of a cooling medium or water-circulation, substantially as described.

3. The process of producing cold for the manufacture of ice and for other purposes, consisting in heating a binary liquid composed of an absorbent liquid and a volatile refrigerating agent, substantially as described, expelling thereby the said agent from said absorbent, condensing or liquefying it by the pressure of its own vapor and a low temperature produced in the condenser by the evaporation of a volatile liquid, and causing the volatilization and reabsorption of the refrigerating agent, the said volatile liquid being recondensed and reused, substantially as set forth.

4. A binary liquid composed of an absorbent liquid having a boiling-point above that of water and a refrigerating agent absorbable therein, but capable of being driven off and condensed by the tension of its vapor at a temperature below the boiling-point of water, substantially as described.

5. A binary liquid composed of an absorbent liquid, as described, such as oxalic ether, sulphate of methyl, or other like liquids or mixtures thereof, having a boiling-point above that of water, and sulphurous dioxide, substantially as set forth.

6. The method of safely transporting ethers by the application of their hereinbefore-described properties, consisting in causing sulphurous dioxide to be absorbed therein, whereby they are rendered uninflammable, and after they are carried to the required place expelling the absorbed sulphurous dioxide by the application of a gentle heat or a water-bath, or other suitable means, substantially as described.

7. In the production of cold by ice-machines, in which the condensation of the gaseous refrigerant is effected by the pressure due to the tension of its own vapor, and in which said refrigerant is alternately absorbed in and expelled from a suitable liquid, the method whereby the clogging of the apparatus by the freezing of said liquid is avoided, consisting in introducing into the machine an uncongealable liquid in which the said refrigerant is absorbable, and from which, when absorbed, it is driven off at a temperature below the boiling-point of the uncongealable liquid, and causing the said refrigerant to be absorbed in and expelled from said liquid, substantially as set forth.

In testimony whereof we have signed this specification in the presence of two subscribing witnesses.

C. M. TESSIÉ DU MOTAY.
AUGUSTE J. ROSSI.

Witnesses:
  A. POLLOK,
  C. EMERSON.